United States Patent
Morris

[15] 3,665,769
[45] May 30, 1972

[54] ACCELERATION SWITCH

[72] Inventor: Harold D. Morris, Orinda, Calif.

[73] Assignee: Systron-Donner Corporation, Concord, Calif.

[22] Filed: May 17, 1968

[21] Appl. No.: 730,125

[52] U.S. Cl. .............................................................73/517
[51] Int. Cl. .......................................................G01p 15/08
[58] Field of Search....................73/490, 492, 503, 516, 517, 73/509; 200/61.45; 102/70.2

[56] References Cited

UNITED STATES PATENTS

| 2,475,730 | 7/1949 | Wandrey | 73/503 X |
| 2,957,653 | 10/1960 | Gillum | 73/517 X |
| 3,035,520 | 5/1962 | Koeppen | 73/517 X |
| 2,851,554 | 9/1958 | Feng et al. | 73/509 |
| 2,923,904 | 2/1960 | Hieber | 73/517 UX |

Primary Examiner—James J. Gill
Attorney—Flehr, Hohbach, Test, Albritton & Herbert

[57] ABSTRACT

Acceleration switch having a mass and means for sensing when the position of the mass is shifted from a normal position under the force of acceleration and supplying an output signal after a predetermined period of time.

18 Claims, 6 Drawing Figures

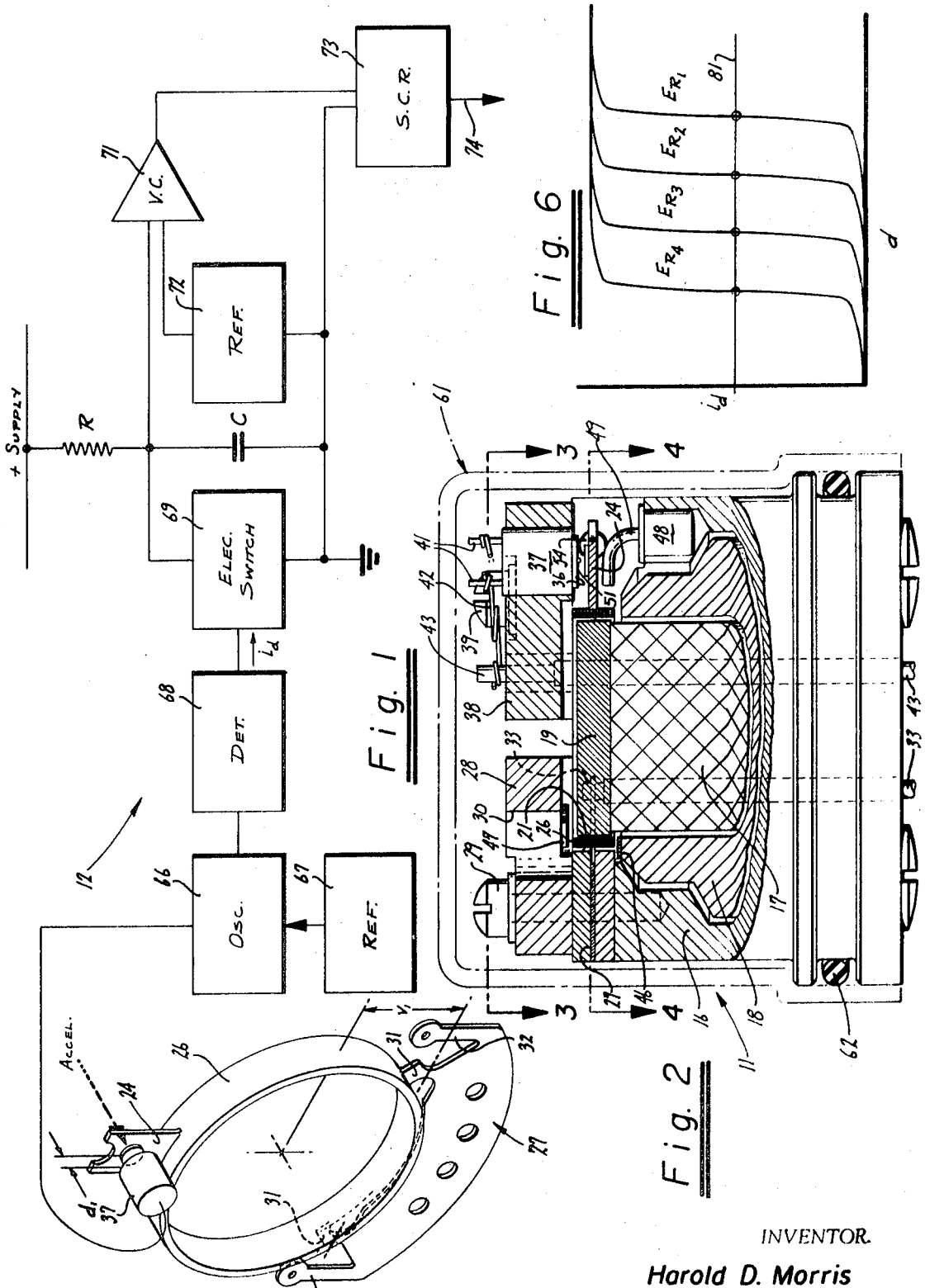

Patented May 30, 1972

INVENTOR.
Harold D. Morris
BY Flehr, Hohbach, Test,
Albritton & Herbert
Attorneys INVENTOR.
Harold D. Morris

3,665,769

ACCELERATION SWITCH

BACKGROUND OF THE INVENTION

A requirement has arisen for an acceleration switch which is capable of sensing a very low level of acceleration and to determine reliably that the acceleration is above or below a predetermined critical level, while at the same time being subject to very high vibration and shock levels. Heretofore, acceleration switches capable of meeting such requirements have not been available. There is, therefore, a need for such an acceleration switch.

SUMMARY OF THE INVENTION AND OBJECTS

The acceleration switch consists of a mass and means for positioning the mass in a normal position. Pick-off means is provided for sensing the position of the mass. Means is connected to the pick-off means and provides a signal when the mass moves from said normal position under the force of acceleration. Means is provided which is responsive to the signal for determining when a predetermined interval of time has elapsed after receipt of the signal and for providing an output signal when said predetermined interval of time has elapsed.

In general, it is an object of the present invention to provide an acceleration switch which is capable of performing logic actions based on measurements of acceleration in the presence of high amplitude vibration and shock.

Another object of the invention is to provide an acceleration switch of the above character which will sense very low levels of acceleration.

Another object of the invention is to provide an acceleration switch of the above character which can be utilized for actuating destruct systems on vehicles as, for example, a stage of a missile.

Another object of the invention is to provide an acceleration switch of the above character which can be readily adjusted for various accelerations.

Another object of the invention is to provide an acceleration switch of the above character which has a bistable characteristic with respect to acceleration.

Additional objects and features of the invention will appear from the following description in which the preferred embodiment is set forth in detail in conjunction with the accompanying drawing.

BRIEF DESCRIPTION OF THE DRAWING

FIG. 1 is a block diagram of an acceleration switch incorporating the present invention and showing certain parts schematically.

FIG. 2 is a side elevational view, with certain parts broken away, of the mechanism of the acceleration switch.

FIG. 6 is a graph showing the changes in switching points which can be obtained by utilizing different reference voltages in the acceleration switch.

DESCRIPTION OF THE PREFERRED EMBODIMENT

Figure 3:
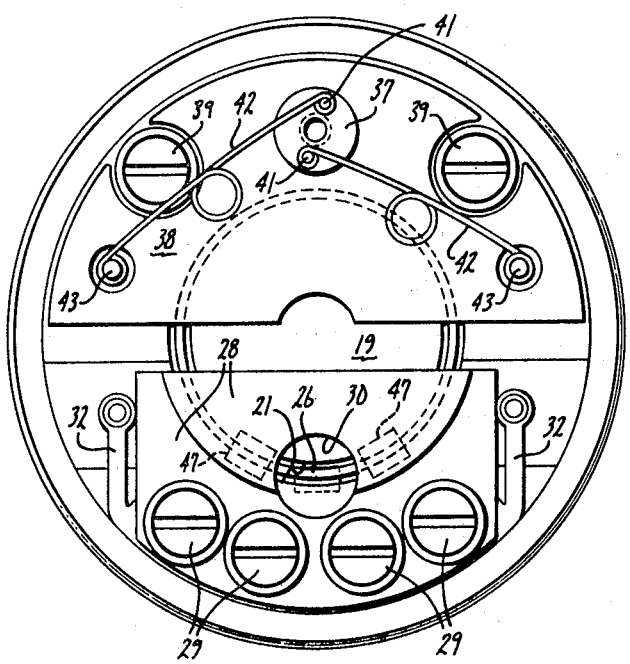
FIG. 3 is a cross-sectional view taken along the line 3—3 of FIG. 2.

The acceleration switch consists of a mechanism 11 and electronic circuitry 12. The mechanism 11 is somewhat similar to a mechanism disclosed in U.S. Pat. No. 3,331,253. It consists of a cylindrical soft iron pole piece 16. A cylindrical permanent magnet 17 of suitable material such as "Alnico" is mounted in the substantially cylindrical pole piece so that its upper extremity is generally of the same height as the top of the cylindrical pole piece 16. A filler 18 of a suitable material such as aluminum is provided between the pole piece 16 and permanent magnet 17 and is dimensioned so that it is spaced from both the pole piece and the permanent magnet. A cap 19 of soft iron is mounted on top of the cylindrical magnet 17 and facilitates the passage of magnetic lines of flux through an annular air gap 21 between the permanent magnet 17 and the pole piece 16. The soft iron pole piece 16 serves as a return path for the magnetic lines of flux.

A paddle 24 having a hole 25 to permit the flow of damping fluid therethrough is mounted on a cylindrical coil 26 which is disposed in the air gap 21 for a purpose hereinafter described. The coil 26 forms a part of the moving mass with the paddle 24. The moving mass is yieldably held in a predetermined position by a two-part flexure or spring-like member 27 which is clamped to the cylindrical pole piece 16 by a block 28 secured to the pole piece 16 by screws 29. The block 28 is formed with a hole 30 to permit viewing of the coil 26. The flexure 27 is formed of a suitable material such as beryllium copper and has a stiffness such that the pendulous mass deflects only a very small amount as, for example, 1° under a 1 G acceleration. The flexure 27 is provided with a pair of spaced legs 31 which are secured to the outer surface of the coil 26 as shown particularly in FIG. 1. The legs 31 are secured to the coil at points spaced approximately 120° apart and approximately 120° from the paddle 24. The flexure 27 is also provided with a pair of spaced tails 32 which are secured to insulated feed-through terminals 33 provided in the pole piece 16. The tails 32 are connected to opposite ends of the coil 26 by small wires (not shown). The weight of the paddle 24 and the coil 26 is such that the flexure 27 has sufficient spring force to retain the paddle 24 and the coil 26 in a predetermined position within the air gap 21. The ratio of mass to strength is extremely high making the mechanism extremely resistant to shock and vibration. As pointed out in U.S. Pat. No. 3,331,253, flexure 27 is formed in two parts and is insulated from the plate 28 and from the pole piece 16 by suitable means such as strips of plastic (not shown) so that the two separate portions of the flexure 27 can serve as a part of the conductors for supplying energy to the coil 26.

Means is provided for sensing the position of the moving mass and particularly the paddle 24 and consists of an inductive pick-off element 36 in the form of a pick-off coil of the type described in U.S. Pat. No. 3,074,279 which is mounted upon one end of a cylindrical slug 37. The slug 37 is mounted in a block 38 secured to the pole piece 16 by screws 39. The pick-off element is connected to terminals 41 extending through the slug 37 and which are connected by wires 42 to insulated feed-through terminals 43 extending through the pole piece 16. The pick-off 36 is non-reacting to the mass 24. In other words, the pick-off 36 does not push on the mass nor does excitation of the pick-off influence the position of the mass. Likewise, the mass does not have to be magnetic which means that it cannot be influenced by extraneous magnetic fields. The mass 24, however, must be electrically conducting so that it reflects into the pick-off coil a varying amount of load as pointed out in Morris U.S. Pat. No. 3,074,279. The mass 24 acts as a shorted turn and thus represents a variable load which is sensed by the oscillator, turning the oscillator off when the reflected load resistance is too low.

The mechanism is provided with means for making it possible for the mechanism to operate in the presence of high amplitude vibrations and shock. This means consists of a plurality of stops which serve as bumpers to prevent damage to the mechanism. Thus, there has been provided a stop 46 on top of the filler 18 and immediately underlying the portion of the coil 26 adjacent the flexure 27. A stop 47 is mounted upon the block 28 and immediately overlies the portion of the coil 26 adjacent the flexure 27. On the other extremity of the coil 26 means is also provided for restraining movement of the coil and consists of a feed-through terminal 48 mounted in the pole piece 16. The wire 49 of the terminal 48 is bent over to form a stop adapted to be engaged by one side of the paddle 24. A wire 51 is mounted upon the pick-off element 36 and extends diametrically across the pick-off element to serve as a stop for the other side of the paddle 24.

These stops serve to prevent deflection of the flexure 27 beyond its elastic limit in the direction of the sensitive axis for the acceleration switch thereby preventing formation of a permanent set in the flexure. If a permanent set were permitted to be induced into the flexure, this would change the switch point of the acceleration switch and, in addition, might possibly cause the acceleration switch to fail after a certain number of shock loadings. Thus, by way of example, the stops can be so positioned so that the coil 26 cannot move along the sensitive axis more than 6 milli-inches.

Figure 4:
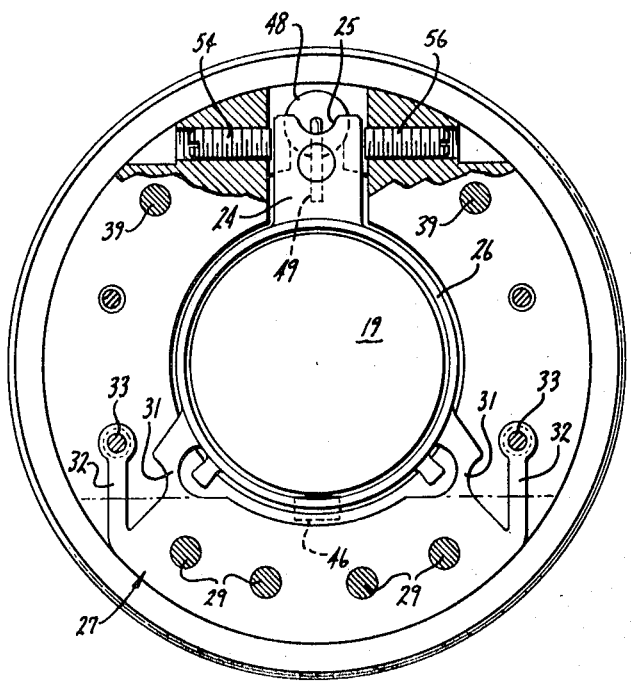
FIG. 4 is a cross-sectional view taken along the line 4—4 of FIG. 2.

Means is also provided for preventing movement of the paddle 24 too far in a sideways direction and consists of a pair of screws 54 and 56 threaded into the pole piece 16 and adapted to be engaged by opposite sides of the paddle 24. The screws 54 and 56 are adjusted so they are within 0.0015 to 0.0002 of an inch away from the edge of the paddle. This prevents movement of the coil 26 in a direction parallel to the plane in which the coil lies to prevent collapse of one of the legs 31 of the flexure 27. In addition, between the face of the pole piece formed by the permanent magnet 17 and the coil 26, there is provided a relatively small space as, for example, 0.002 to 0.003 of an inch which would mean that if a great force were applied to the acceleration switch so as to cause the coil 26 and the paddle 24 carried thereby to shift the coil 26 in a direction towards the flexure 27 to attempt to collapse the legs 31 of the flexures, the upper portion of the coil as viewed in FIG. 4 would come to rest against the face of the central pole piece 17 to prevent further collapse and possible permanent sets in the legs 31 of the flexures. Thus, it can be seen that means is provided for limiting movement of the mass in all directions which would have any tendency to cause damage to the mechanism.

The entire mechanism can be enclosed within a case 61 shown in dotted lines and then filled with a suitable damping fluid such as oil. An O-ring 62 forms a seal between the case 61 and the cylindrical pole piece 16.

As indicated in FIG. 1, the deflection of the spring-restrained mass is directly proportional to acceleration along the sensitive axis. There exists a specific position representing the steady state position of the mass for each value of input, i.e., zero, 0.75G and 2.0G. Thus, the mechanism can be aligned so that the switch point of the acceleration switch is set at a predetermined value of acceleration as, for example, 0.75G. As hereinafter explained, the electrical characteristics of the electronic circuitry 12 are set so that the acceleration switch will switch at a predetermined or critical spacing as, for example, spacing $d_1$ as shown in FIG. 1, and the electronic circuitry then senses whether the mass is closer than $d_1$ or farther away than $d_1$ to give first and second indications which are comparable to first and second states of a bistable device. Thus, the spacing $d_1$ represents the point at which the acceleration switch would operate.

Basically, as shown in FIG. 1, the electronic circuitry consists of an oscillator 66 which is connected to the pick-off element 36. The oscillator 66 is provided with a reference 67 and supplies its output to a detector 68. The output of the detector is supplied to an electric switch 69, the output of which is supplied to a voltage comparator 71 which receives its other input from a reference 72. The output of the voltage comparator is supplied to a silicon controlled rectifier 73 which has an output 74. The block diagram also includes an integrating capacitor C which is connected to a power supply through a resistor R.

Figure 5:
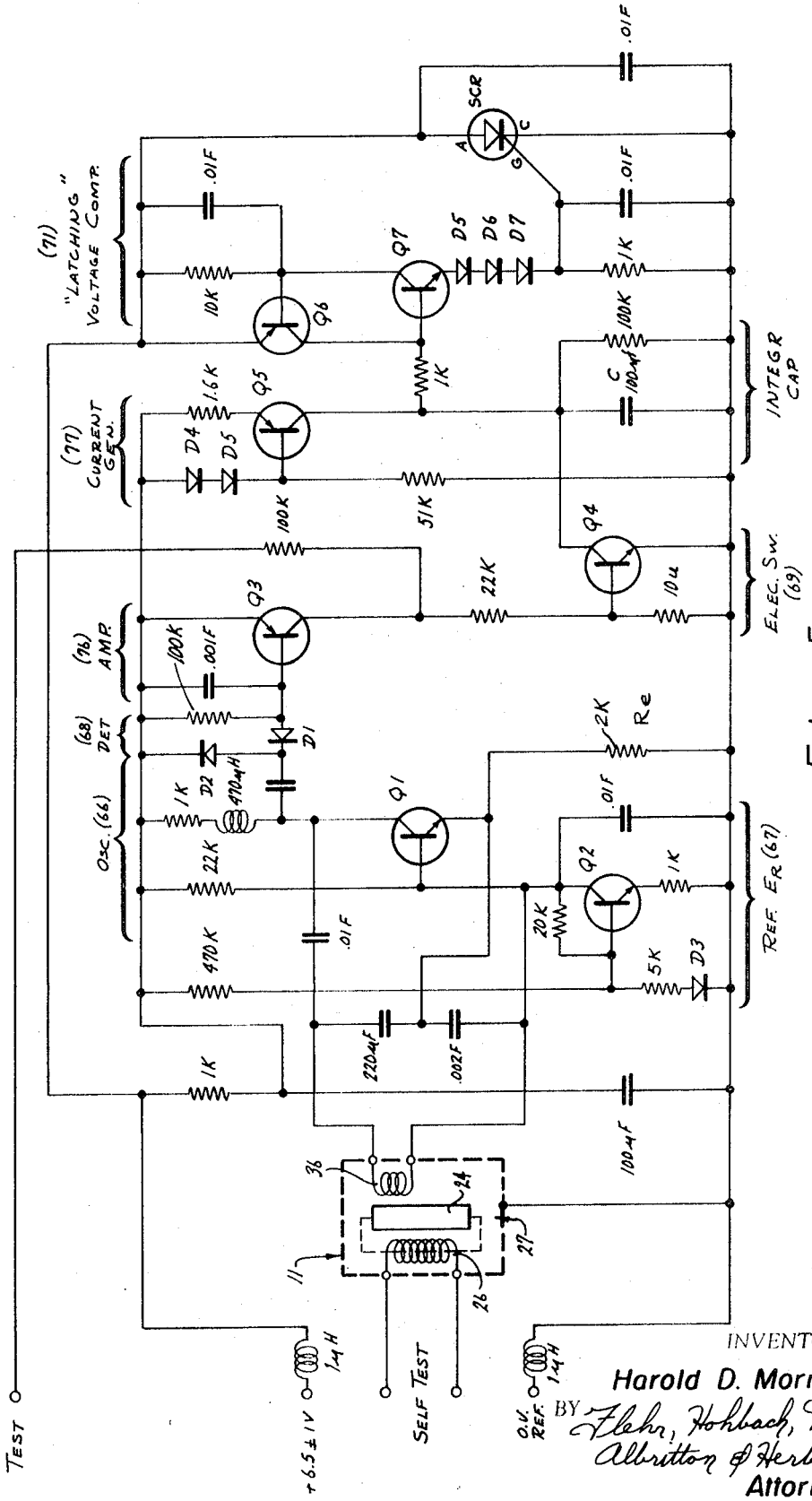
FIG. 5 is a circuit diagram of the electronic circuitry utilized in the acceleration switch.

A specific embodiment of the electronic circuitry is shown in FIG. 5. As can be determined, the circuitry in many respects is similar to that disclosed in Morris U.S. Pat. No. 3,074,279. However, in that patent, the electronic circuitry is utilized in a closed loop servo, whereas in the present acceleration switch, the electronic circuitry is utilized in an open loop condition, that is, the electronics merely determine whether the mass is closer or farther away than a predetermined spacing. This is determined by the oscillator circuit which includes the transistor Q1 and the pick-off coil 36. The oscillator ceases to oscillate when the paddle 24 is closer than the spacing $d_1$ and oscillates when the paddle 24 is farther away than the distance $d_1$. The point at which the oscillator oscillates with respect to a predetermined paddle spacing is determined by the reference $E_r$ and the emitter resistor $R_e$ for the transistor Q1. By adjusting the emitter resistor $R_e$ and/or the reference $E_r$, the switch point for the acceleration switch can be set over a relatively wide range of acceleration or paddle spacing.

The reference $E_r$ includes a transistor Q2 and applies a voltage to the base of the oscillator transistor Q1 which is independent of line voltage. The transistor type circuit is utilized as a regulator and a reference in place of a Zener diode because of the supply voltage range, i.e., 5½ to 7½ volts, in which the electronic circuitry works. The transistor Q2 acts as a partial sign changer connected into the resistor network shown so that when the line voltage increases, the base current of the transistor Q1 is increased which, in turn, causes the collector voltage of the transistor Q1 to decrease or move towards zero volts. This is the opposite direction so that which would be caused by the current flowing through the 22K resistor connected to the base of the transistor Q1. By adjusting the resistive ratios of the 470K, the 20K, the 5K, the 22K and the 1K resistors, it is relatively easy to provide a reference for the base of the transistor Q1 which is independent of line voltage and which is also independent of temperature changes.

Thus, it can be seen that the output of the oscillator 66 is either full on or full off, which condition is detected by the detector 68 consisting of diodes D1 and D2 which operate in the same manner as the detector disclosed in Morris U.S. Pat. No. 3,074,279, and which correspond to diodes 46 and 47 in FIG. 2 of that patent. The DC output from the detector 68 is then amplified, if desired, by an amplifier 76 including transistor Q3. The output of the amplifier 76 is supplied to an electronic switch 69 which includes the transistor Q4 and which has its emitter and collector connected directly across the integrating capacitor C.

When the oscillator 66 is on, the transistor Q3 is turned on which turns on Q4. When Q4 is turned on, the integrating capacitor C is shorted out. Therefore, when the mass 24 is pulled farther away from the pick-off coil than the distance $D_1$, the oscillator 66 oscillates, the detector 68 detects the output, the amplifier 76 amplifies and the electronic switch shorts out the integrating capacitor C and nothing further happens. However, when the mass 24 is moved closer to the pick-off element 36 than the distance $d_1$, the oscillator 66 is turned off which, in turn, causes the electronic switch transistor Q4 to be turned off and permits integrating capacitor C to begin integrating. Charging current for the integrating capacitor C is supplied by the current generator 77 which includes the transistor Q5. The transistor Q5 is, in fact, a current regulator and acts in much the same way as the transistor X4 in FIG. 2 of Morris U.S. Pat. No. 3,074,279. The diodes D4 and D5 perform as the diodes 78 and 79 in Morris U.S. Pat. No. 3,074,279. This transistor ensures that a constant current is supplied to the integrating capacitor C, which current is shorted out through the transistor Q4 when the transistor Q4 is turned on.

When Q4 is not turned on, i.e., not conducting, the current from Q5 charges the integrating capacitor C until the transistor Q7 of the voltage comparator 71 is turned on. The transistor Q7 has in series with its emitter, three diodes D5, D6 and D7 which are connected through a 1K resistor to ground. When current begins to flow through these diodes D5, D6 and D7, most of the current will come from the collector of the transistor Q7 which will, in turn, increase the bias on the base of the transistor Q6. This will increase the current flow through the transistor Q7 so that both Q6 and Q7 will be conducting heavy currents which are sufficient to fire the output of the SCR device by current flowing into the gate G. When the current flowing into the gate of the SCR reaches a critical level, the SCR device begins conducting and will carry a very heavy current as, for example, 5 amperes of line current with a drop of less than 1½ volts. As soon as the SCR device begins conducting, the SCR device in effect places a short circuit directly across the 6½ volt power supply input terminals.

From the foregoing, it can be seen that the transistors Q6 and Q7 make up the voltage comparator 71 to provide a positive feedback latching circuit which determines when a predetermined amount of trip current has entered the base of the transistor Q7. When this predetermined amount of current enters the base of the transistor Q7 which, in turn, causes a predetermined amount of current flow through the emitter of the transistor Q7 through the three series diodes D5, D6 and D7, positive feedback latching of the transistors Q6 and Q7 is obtained which produces the large output pulse from the SCR device. The reference or voltage delay 72 shown in the block diagram is actually the forward voltage of the three discrete silicon diodes D5, D6 and D7 plus the emitter-base voltage of the transistor Q7. These act as a constant voltage device and only conduct when the forward voltages of the diodes are exceeded which, by way of example, is in the vicinity of 2 volts. Thus, when the voltage from base to ground on the base of transistor Q7 rises to 2 volts, the four series diodes will begin to conduct sufficiently to trip the SCR device. As can be seen from the circuit diagram, the anode A of the SCR device is connected directly to the 6½ volt source. It should be appreciated that, if desired, a load can be connected between the source and the anode of the SCR device. This would then permit the acceleration switch to perform switching at the end of a predetermined time delay by shorting across its power input terminals.

The amount of time delay which is desired can be varied by changing the size of the integrating capacitor C. In addition, the current utilized for charging this integrating capacitor C can be regulated by adjustment of the current generator 77. This is accomplished by adjustment of the 1.6K resistor connected to the emitter of transistor Q5. The diodes D4 and D5 produce a voltage drop when current flows through them, through the 51K resistor to ground. One of the diodes compensates for the emitter-base diode of the transistor Q5, and the other diode forces the transistor Q5 to produce a voltage equal to a diode drop across the 1.6K resistor corresponding to the drop across the diode. By adjusting the 1.6K resistor, the collector current of transistor Q5 which flows into the integrating capacitor C can be adjusted. Thus, during the charging period, the current will flow into the integrating capacitor C and then when charging is completed, will transfer over into the base of the transistor Q7 to turn it on. Thus, the transistor Q7 is essentially non-conducting up to the switch point itself. When the switch point is reached, the transistor Q7 and the diodes in its emitter circuit will form a shunt path around the integrating capacitor C and, therefore, at a predetermined current level, i.e., 50 microamperes flowing through the 1K resistor, positive feedback will occur tripping the latching circuit and producing an output pulse as hereinbefore described.

The bistable characteristic of the acceleration switch is shown in FIG. 6 in which $i_d$ represents the detector current from the detector 68 on the ordinate and the paddle spacing $d_1$ is shown on the abscissa. Four curves $E_{R_1}$, $E_{R_2}$, $E_{R_3}$ and $E_{R_4}$ for four different increasing values of reference voltage $E_R$ are shown which indicate that the higher the reference voltage, the more current will flow through the oscillator and the closer to zero paddle spacing the acceleration switch would like to discriminate. A line 81 extending across the four curves at points indicated by circles indicates the points at which the acceleration switch would turn on as the mass is moved through the switch point with respect to different values of reference voltage. As explained above, by adjusting the reference voltage $E_R$ and/or the emitter resistor $R_E$, it is possible to set this switch point over a wide range of acceleration. In addition, it is possible in the production of a plurality of acceleration switches to adjust each of the switches to switch at a predetermined G level in spite of slight differences in the electronics and the mechanism.

The electronic circuit which is shown in FIG. 5 also includes the self-test coil 26 which is the coil 26 forming a part of the moving mass. By placing a current in this self-test coil 26, it is possible to apply a force to the coil 26 and the paddle 24 in the same manner as when the acceleration switch is being accelerated. By applying this current, the paddle 24 can be moved towards or away from the pick-off coil by the interaction with the magnetic field produced by the permanent magnet 17 disclosed in Morris U.S. Pat. No. 3,074,279. The actual performance of the acceleration switch can be very closely approximated by applying a static force to the torque coil by current flowing therein and applying vibration and shock or other environmental tests to the acceleration switch.

This self-test coil can be readily used for checking where the acceleration switch is switching and how it operates. In addition, a test terminal has been provided which can be utilized for examining the switching point of the electronics without waiting for the time delay provided by integrating capacitor C. From the output of the amplifier 76, it can be determined immediately whether a signal was or was not received which could be utilized for actuating the SCR device. Thus, this test terminal can be utilized to determine how sensitive the acceleration switch is. Also, it can be utilized to determine the stiffness of the flexure or spring 27 which is utilized for supporting the mass 24. It also can be utilized for determining what force can be applied to the paddle 24 by the torque coil and what force is required to flex the flexure 27. In other words, many features of the acceleration switch can be determined. The acceleration switch also has a great advantage in that it can be adjusted electrically without the necessity of touching the mechanical system.

In one embodiment of the invention, the acceleration switch is utilized to determine if acceleration exceeds a certain predetermined level after power is turned on to the acceleration switch as, for example, after a predetermined time delay as determined by the delay given by the integrating capacitor C. This is used for firing a squib which, in turn, destructs a missile to provide a range safety function in case the missile breaks up during launch. The acceleration switch causes destruction of a stage of the missile which had a thrust which is greater than a predetermined acceleration as, for example, 0.6G. In this particular application, it is necessary for the acceleration switch to determine this relatively low value of G in the presence of an extremely high vibration as, for example, 68 G RMS random. In addition, it is necessary for the acceleration switch to operate even after the shock of explosive separation of two stages of the missile in normal flight of the missile as, for example, 5,000 G peak shock. In normal flight, it is necessary for the acceleration switch to ascertain that there was no or substantially no acceleration after separation and, therefore, not cause destruction of the missile stage carrying the same.

It has been found that the acceleration switch is capable of sensing a very low level of G and to determine reliably whether the acceleration is above or below a particular critical level and that it has been able to do this in spite of vibration levels that hit peaks of 400 times as high as the switching level and shock levels that possibly can reach 5,000 G. It can be seen that the acceleration switch can be utilized for performing logic functions based on measurements of acceleration which have a value which is only a small fraction of the amplitude vibrations and shock which may be encountered.

The case 61 of the acceleration switch is preferably filled with a damping medium to prevent the mass from responding to extremely high amplitude vibration. If there were no damping medium within the case, natural frequency of the mass on the flexure 27 would be in the vicinity of 40 cycles per second. However, the presence of the damping medium in effect attaches additional mass to the moving system such that when the mass moves, it carries fluid with it. This represents additional inertia to the moving system and lowers its natural frequency to the vicinity of 15 cycles per second. In addition, the damping medium can be selected to provide any arbitrary amount of damping desired. By way of example, it has been found that a damping medium which provides a ratio of approximately 10 times critical damping is satisfactory. Such a ratio provides an operating bandwidth which is only ½ cycle per second. By this it is meant that the mass begins falling behind the sinusoidal input acceleration at very low frequencies, and at ½ cycle, the mass is lagging by approximately 45° and its amplitude has fallen as much as 3 db. Thus, it can be seen that the transfer function or frequency of response of the acceleration switch is extremely slow. By way of an example, such an acceleration switch can have a time constant of ⅓ of a second. This means that the acceleration switch is essentially averaging the input thrust of the acceleration being sensed over a 0.3 of a second period. Although this means that the acceleration switch cannot respond rapidly, on the other hand, it makes it possible to provide an acceleration switch which will not actuate spuriously in the presence of high level vibration and shock.

In operation in a missile, no power is applied or needed by the acceleration switch during the entire launch period up until third stage separation takes place when the acceleration switch is mounted on the third stage and a lanyard is pulled closing the battery circuit to the acceleration switch.

During the period of high thrust and vibration of engine firing, the mass in the sensor remains pressed by the acceleration against the back stops, in a position of heavy damping. During this period of time, the acceleration switch need only ride along since no power is applied and no action is being taken or even possible in such condition. At normal thrust termination, the mass 24 moves through the switch point of the pick-off to zero G position, taking less than, for example, 0.3 second to switch the electrical output of the pick-off.

At the time the lanyard is pulled, the mass is near its 2.0 G point in space so that application of power to the acceleration switch causes the pick-off amplifier to turn on. This, in turn, applies internal power to the integrating capacitor which serves to provide a predetermined time delay as, for example, a 0.8 second time delay.

If the engine failed to stop at separation, the mass would remain over against the back stop, the 0.8 second time delay circuit would time out and the output of the SCR device would fire the destruct squib for the third stage.

If the engine stopped as it would in normal operation sequence, the mass 24 would move through the switch point before 0.3 second had elapsed, switching the pick-off to off, stopping the 0.8 second delay circuit and inhibiting the function of the acceleration switch. A subsequent rising of thrust would move the mass away from the pick-off again but would require a full 0.8 second to activate the output SCR switching device.

From the foregoing, it can be seen that the acceleration switch acts as a digital device in that it is either on or off. The only exception to this within the acceleration switch is the integrating capacitor C which can time out during the time the acceleration is above a predetermined critical level but which is shorted out and reset during the time that the acceleration is below the predetermined critical level.

As explained above, the mechanism is particularly rugged and is able to withstand very high vibration levels and extreme shock. This is made possible by the viscous damping and by the stops hereinbefore described which serve as bumpers around the moving parts of the mechanism so that they cannot be overloaded or damaged in the presence of high level vibration or extreme shock.

I claim:

1. In an acceleration switch, a movable mass, means positioning said mass in a normal position and biasing said mass towards said normal position whenever said mass is moved by acceleration, pick-off means forming an electrical impedance responsive to displacement of said mass from said normal position for varying the electrical impedance as a function of said displacement, means connected to said pick-off means being responsive to the variation in impedance exceeding a predetermined amount for producing an electrical signal having a steady state value and electrical storage means for accumulating said signal and producing an output if said signal is maintained a predetermined continuous interval of time.

2. An acceleration switch as in claim 1 together with stop means spaced from said mass and adapted to be engaged by the mass to prevent damage to the movable mass.

3. An acceleration switch as in claim 2 wherein said pick-off means includes a pancake-like coil and wherein said mass includes a paddle adapted to be disposed in the vicinity of said pancake-like coil and wherein said stop means is adapted to engage said paddle to prevent movement of the paddle beyond predetermined positions.

4. An acceleration switch as in claim 1 wherein said means for positioning said mass includes yieldable means serving to generally retain said mass in said normal position.

5. An acceleration switch as in claim 1 wherein said yieldable means consists of a flexure formed of beryllium copper.

6. An acceleration switch as in claim 1 wherein said mass includes a torque coil together with a magnet for establishing a magnetic field in the vicinity of the torque coil.

7. An acceleration switch as in claim 1 wherein said electrical storage means consists of a capacitor and means for supplying a regulated current to the capacitor.

8. An acceleration switch as in claim 7 wherein said means connected to said pick-off means includes an oscillator connected to the pick-off means, detector means for detecting the output of the oscillator and electronic switch means for determining when there is an output from the detector means and causing a charge to be placed on the capacitor and means for determining when the charge on the capacitor has reached a predetermined value to cause the production of an output pulse.

9. An acceleration switch as in claim 8 wherein said means for determining when the charge on the capacitor has been reached a predetermined value includes a latching voltage comparator and a silicon controlled rectifier connected to the voltage comparator and producing an output pulse at the time that the voltage comparator becomes latched.

10. An acceleration switch as in claim 9 wherein said comparator includes a pair of transistors having collector, base and emitter elements and a plurality of serially connected diodes connected to the emitter element of one of the transistors.

11. An acceleration switch as in claim 8 together with transistor means for regulating the voltage applied to the oscillator.

12. An acceleration switch as in claim 1 wherein said mass consists of a paddle together with a cylindrical torque coil, means mounting said paddle on said torque coil, a magnet for establishing a magnetic field about the torque coil, a spring-like flexure secured to the torque coil and means for mounting the spring-like flexure to support the torque coil and the paddle carried thereby in the normal position.

13. An acceleration switch as in claim 12 wherein said magnet is cylindrical and wherein said torque coil is mounted on said magnet, together with means preventing movement of the torque coil in a direction parallel to the axis of the torque coil beyond predetermined limits.

14. An acceleration switch as in claim 13 together with additional stop means adapted to be engaged by the paddle for preventing movement of the paddle in a rotational direction about the axis of the torque coil.

15. An acceleration switch as in claim 13 together with means for preventing movement of the paddle beyond predetermined limits in a direction generally perpendicular to the axis of the torque coil.

16. In an acceleration switch, a movable mass, means positioning the movable mass in a normal position and permitting movement of the mass under the force of acceleration from said normal position while biasing said mass toward said normal position whenever said mass is moved by acceleration, pick-off means forming an electrical impedance responsive to displacement of said mass from said normal position for varying said impedance as a function of said displacement, means connected to said pick-off means for producing a first electrical signal having a steady state value when said mass is moved in one direction from said normal position and a second electrical signal having a steady state value when said mass is moved in an opposite direction from said normal position and electrical storage means for accumulating said first and second electrical signals and producing an output if one of said first and second electrical signals is maintained for a predetermined continuous interval of time.

17. An acceleration switch as in claim 16 wherein said last named means also includes time delay means which provides an output signal after a predetermined time has elapsed after receipt of one of said first and second electrical signals.

18. An acceleration switch as in claim 16 wherein said means for producing first and second electrical signals includes electrical means for establishing the normal position for the mass and thereby establishing an adjustable critical value of impedance to serve as switch points between said first and second electrical signals over a wide range of acceleration.

* * * * *